United States Patent

Young

[11] Patent Number: 5,217,317
[45] Date of Patent: Jun. 8, 1993

[54] BRACKET WITH ANGLED NAILING FEATURE

[75] Inventor: Daniel E. Young, Owatonna, Minn.

[73] Assignee: United Steel Products Company, Montgomery, Minn.

[21] Appl. No.: 634,753

[22] Filed: Dec. 27, 1990

Related U.S. Application Data

[62] Division of Ser. No. 370,689, Jun. 23, 1989, Pat. No. 5,004,369.

[51] Int. Cl.[5] .......................... F16B 9/00; E04B 1/38
[52] U.S. Cl. ...................... 403/232.1; 403/14; 403/403; 403/406.1; 52/702; 52/712; 411/537
[58] Field of Search ............... 403/232.1, 13, 14, 403, 403/382, 205, 406.1, 405.1, 402, 230; 411/537, 538; 52/702, 712, 714; 248/547

[56] References Cited

U.S. PATENT DOCUMENTS

| | | |
|---|---|---|
| 770,398 | 9/1904 | Starr . |
| 783,807 | 2/1905 | Tuteur ............................ 403/232.1 |
| 1,406,723 | 2/1922 | Caldwell ......................... 403/232.1 |
| 1,631,812 | 6/1927 | Hawkins ......................... 411/537 X |
| 2,340,924 | 2/1944 | Boye ............................. 403/406.1 X |
| 2,499,683 | 3/1950 | Reyes ............................ 403/14 |
| 2,770,161 | 11/1956 | Schutte ........................... 411/537 X |
| 3,425,473 | 2/1969 | Knowlton ....................... 411/537 X |
| 3,438,300 | 4/1969 | Blom et al. ..................... 411/537 X |
| 4,291,996 | 9/1981 | Gilb ............................... 403/232.1 X |
| 4,423,977 | 1/1984 | Gilb ............................... 403/232.1 |
| 4,572,695 | 2/1986 | Gilb ............................... 403/14 X |
| 4,920,725 | 5/1990 | Gore .............................. 52/702 |
| 5,004,369 | 4/1991 | Young ............................ 403/232.1 |
| 5,111,632 | 5/1992 | Turner ........................... 403/232.1 |
| 5,150,982 | 9/1992 | Gilb ............................... 403/232.1 |

FOREIGN PATENT DOCUMENTS 2072783 10/1981 United Kingdom ................. 403/13
8401193 3/1984 World Int. Prop. O. ........... 403/13

Primary Examiner—Peter M. Cuomo

[57] ABSTRACT

A slope and skew hanger for connecting a rafter to a beam at a variety of slope and skew angles. The hanger includes a connection portion and an integrally attached seat portion which is connected with the connection portion along a bend line. The connection portion includes a central opening, a pair of side connecting brackets joined by connecting strips and adapted for connection to the beam, and a pair of centrally positioned connection flanges extending outwardly from the front face of the connection portion and adapted for connection with the sides of the rafter. A further feature of the present invention is the provision of a raised spherical portion and an offset nail receiving opening to facilitate the angled nailing of such a hanger or bracket to the beam or rafter.

14 Claims, 3 Drawing Sheets

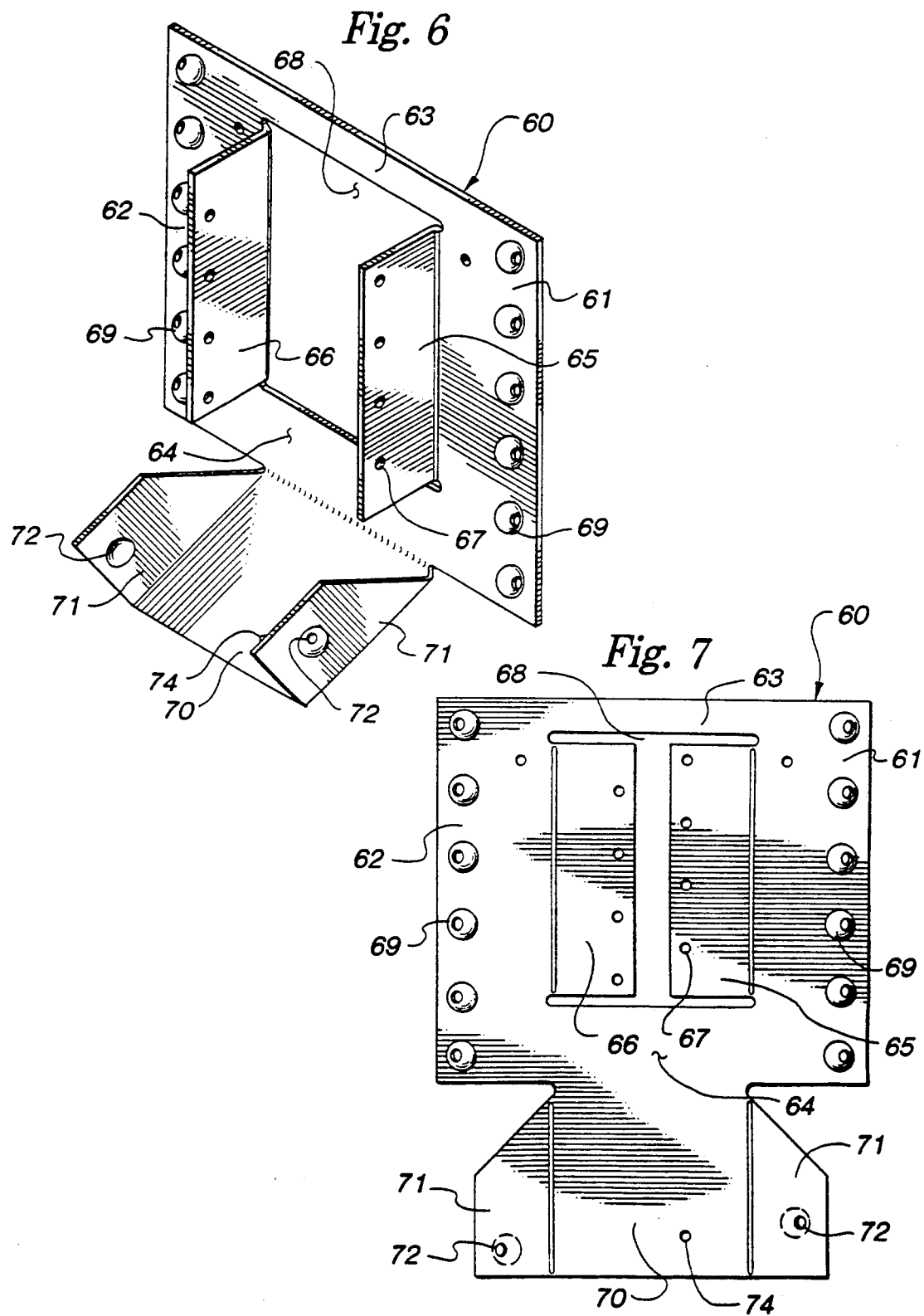

BRACKET WITH ANGLED NAILING FEATURE

This is a division of application Ser. No. 07/370,689 filed Jun. 23, 1989, now U.S. Pat. No. 5,004,369.

BACKGROUND OF THE INVENTION

1. Field of the Invention

The present invention relates generally to a slope and skew hanger for connecting a first or supported wooden member such as a rafter to a second or supporting wooden member such as a beam at a desired slope and skew. A further feature of the present invention is the provision of an improved angle nailing feature which is particularly applicable to the slope and skew hanger of the present invention when the rafter is skewed at a relatively sharp angle relative to the beam.

2. Description of the Prior Art

A variety of hangers and other devices have been used in the prior art to mount a first wooden member such as a rafter to a second wooden member such as a beam at both slope and skew angles. One such prior art device is described in U.S. Pat. No. 4,423,977 and issued to Gilb. This prior art patent discloses a single element slope and skew hanger which includes, among other features, an elongated continuous backplate which is provided with a plurality of longitudinally extending embossments. Such device is also provided with a plurality of tab members and side support members for connecting the hanger to a supported member and a supporting member, respectively. Although the device described in U.S. Pat. No. 4,423,977 is generally acceptable, a need exists for alternative slope and skew hanger devices which provide greater support between the rafter and beam and in which the device is connected with and supports the first member or rafter at a more centrally located position.

Further, because the use of a slope and skew hanger of the type to which the present invention relates commonly requires nailing into the supporting beam at an angle, a need exists for an improved feature facilitating such angled nailing.

SUMMARY OF THE INVENTION

The present invention relates to a slope and skew hanger for supporting a first member or rafter relative to a second wooden member or beam at a variety of slope angles as well as a variety of skew angles. The device of the present invention is formed from a single piece of sheet metal material and provides increased support for the supported wooden rafter relative to the supporting beam.

More specifically, the hanger of the present invention includes a seat portion for connection with a portion of the bottom edge of the supported member or rafter and a connection portion which is integrally joined with the seat and which is bent, configured and cut to provide a pair of side connection brackets for attachment to the supporting member or beam and a pair of connection flanges for connection to opposite sides of the supported member or rafter. In the preferred embodiment, the pair of side connection brackets extend along the entire length of the connection portion. Top and bottom connection strips are provided to join the top and the bottom portions of the side brackets, respectively. The connection flanges are integrally formed with an inner edge of the pair of connection brackets and are positioned between the connection strips joining the connection brackets. With the hanger of the present invention, a supported element or rafter can be supported relative to a supporting member or beam at both a selected slope and a selected skew angle.

In the preferred embodiment of the present invention, the side connection brackets are also provided with a plurality of raised dimples or bubbles to define angled nailing openings and to facilitate angled nailing at points where such nailing is common when using the slope and skew hanger of the present invention. These raised dimples further reinforce the brackets by distributing the load over a greater area.

Accordingly, it is an object of the present invention to provide an improved slope and skew hanger for supporting a supported wooden member such as a rafter relative to a supporting wooden member such as a beam at both a slope and skew angle.

Another object of the present invention is to provide an improved slope and skew hanger which is constructed from a single piece of sheet metal material.

Another object of the present invention is to provide an improved slope and skew hanger which exhibits increased support strength and stability.

Another object of the present invention is to provide an improved hanger device having an improved angle nailing feature to facilitate angled nailing.

These and other objects of the present invention will become apparent with reference to the drawings, the description of the preferred embodiment and the appended claims.

DESCRIPTION OF THE DRAWINGS

FIG. 6 is a perspective view of an alternate embodiment of the slope and skew hanger of the present invention.

FIG. 7 is a plan view of the slope and skew hanger of FIG. 6 showing its formation from a single piece of material.

DESCRIPTION OF THE PREFERRED EMBODIMENT

Figure 1:
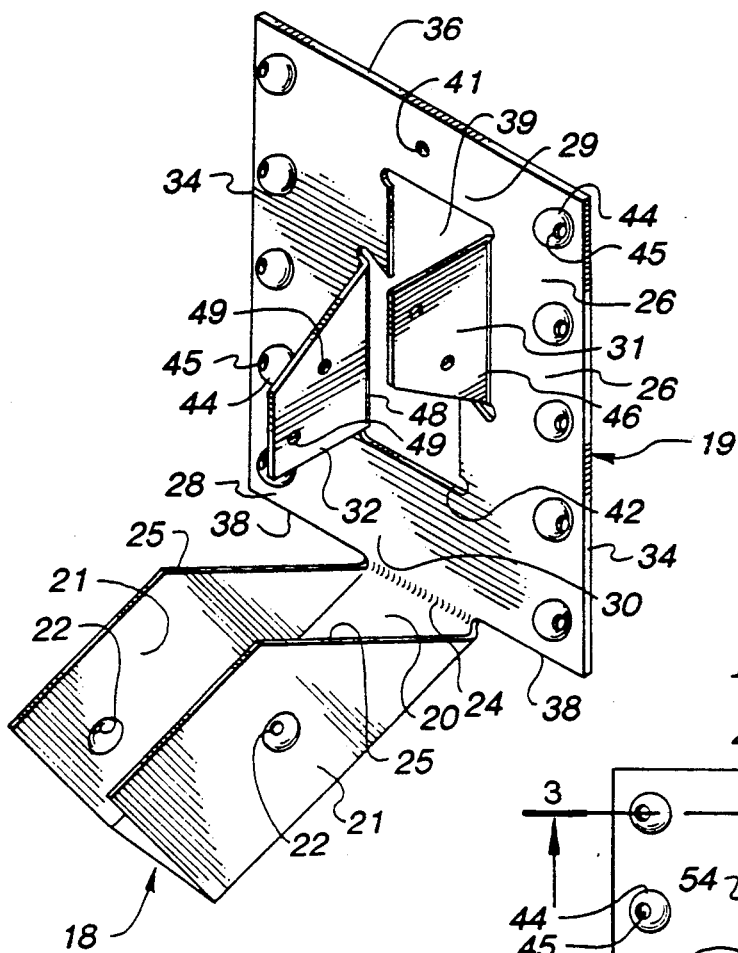
FIG. 1 is a perspective view of the slope and skew hanger of the present invention.
Figure 4:
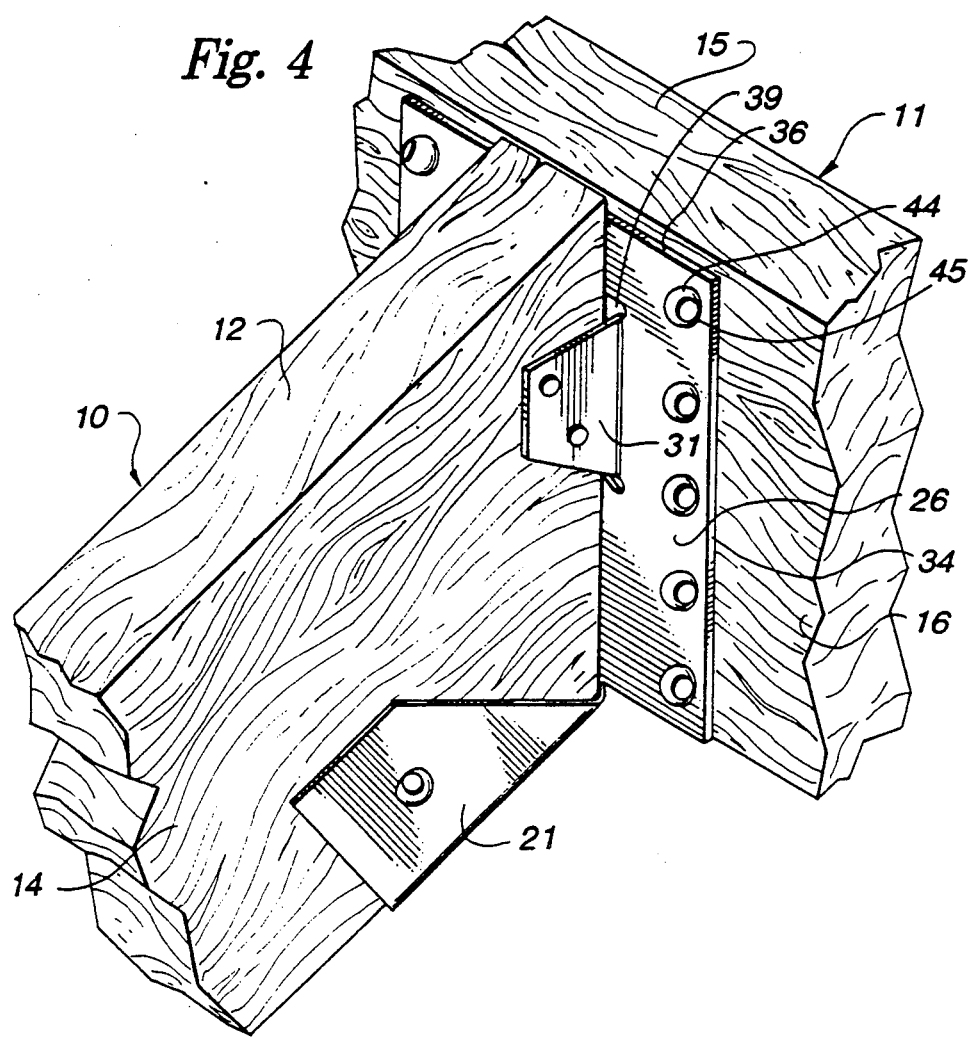
FIG. 4 is a fragmentary perspective view of the slope and skew hanger of the present invention in assembly with supporting and supported members.
Figure 5:
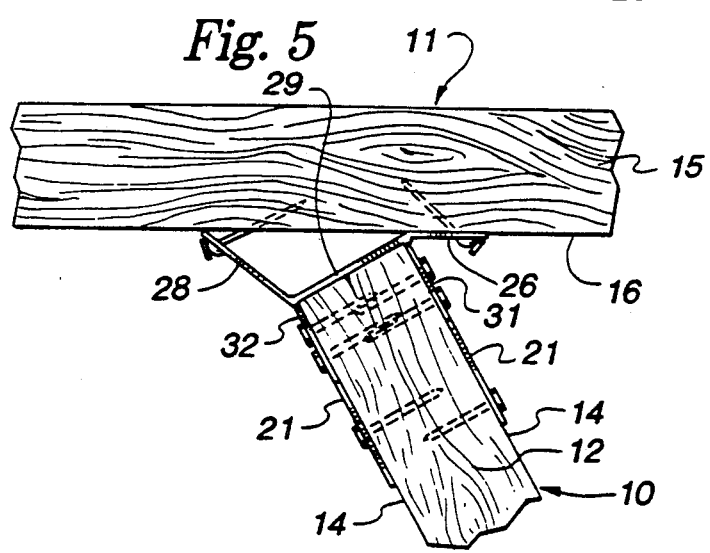
FIG. 5 is a fragmentary perspective view of the slope and skew hanger of the present invention in which the supported member is connected with the supporting member at a skew angle.

The slope and skew hanger per se of the present invention is illustrated best in FIG. 1. FIGS. 4 and 5 illustrate the use of the hanger of the present invention to support a supported member or rafter 10 relative to a supporting member or beam 11 at either a slope or a skew angle, or both. In particular, FIG. 4 shows the hanger of the present invention being used to support a rafter 10 relative to the beam 11 in which the rafter 10 is sloped relative to the beam 11 at an angle other than 90 degrees. FIG. 5 shows the hanger of the present invention being used to support a rafter 10 relative to a beam 11 in a position in which the rafter 10 is skewed relative to the beam 11 at an angle other than 90 degrees. The hanger of the present invention can, of course, be used to support a rafter 10 relative to a beam 11 in which the rafter 10 is both sloped and skewed relative to the beam 11.

With a continuing reference to FIG. 4, the supported member or rafter 10 includes a top edge 12, a pair of parallel sides 14 (only one of which is shown in FIG. 4) and a bottom edge (not shown) which is parallel to the top edge 12. The beam includes a top edge 15, a front face 16 and corresponding parallel back face (not shown) and a bottom edge (not shown) generally parallel to the top edge 15.

The hanger of the present invention is illustrated best in FIG. 1 and is shown as generally comprising a seat portion 18 and a connection portion 19. The seat portion 18 includes a seat member 20 adapted for engagement with the bottom edge of the rafter 10 as shown in FIG. 4. In the preferred embodiment, the seat 20 has a generally rectangular configuration having a pair of side edges and first and second ends in which a first end is integrally connected with the connecting portion 19 along the connection or bend line 24. A nail receiving opening 23 (FIG. 2) is provided in the seat 20 for connection to the bottom edge of the rafter 10 (FIG. 4). The side edges of the seat 20 are generally parallel to one another and are integrally joined with a pair of seat side members 21 which extend outwardly from the seat 20 at substantially right angles. Each of the seat sides 21 is provided with a dimpled nail hole 22 to facilitate connection thereof to the sides 14 of the rafter 10 (FIG. 4). Each of the seat sides 21 also includes a forwardly extending beveled edge 25 which begins near the fold line 24 and extends rearwardly to an outer side edge of the sides 21.

The connection portion 19 of the slope and skew hanger is a generally rectangular member having top and bottom edges 36 and 38 and a pair of outer side edges 34. The portion 19 also includes a central opening 39 having top and bottom inner edges 37 and 42, respectively and a pair of side inner edges 35.

The connection portion 19 further includes a pair of side connection brackets 26 and 28 for connection to the front face 16 of the beam 11 as illustrated in FIGS. 4 and 5. Each of the side connection brackets 26 and 28 includes an outer edge corresponding to the outer edge 34 of the portion 19 and an inner edge coinciding with the edges 35 of the opening 39. Each bracket 26 and 28 also includes a pair of end edge portions coinciding with the top and bottom edges 36 and 38. The top ends of each of the side connection brackets 26 and 28 are integrally connected to one another by a top connecting strip 29. The top connecting strip 29 includes an outer edge which coincides with the top edge 36 of the connection portion 19 and the brackets 26 and 28 to form a continuous top edge. The strip 29 also includes an inner edge positioned between the side brackets 26 and 28 which defines, in part, the central opening 39 in the connection portion 19. The strip 29 is provided with a centrally located nailing opening 41.

The lower ends of the side brackets 26 and 28 are joined together by a bottom connecting strip 30. As illustrated in FIG. 1, the bottom connecting strip 30 is integrally formed with the lower portions of the side brackets 26 and 28. A bottom edge portion of the connecting strip 30 coincides with the bottom edge 38 of the connection portion 19, with a portion being integrally formed with the seat 20 along the bend line 24.

The strip 30 also includes a top edge 42 which defines the bottom edge of the opening 39.

Figure 3:
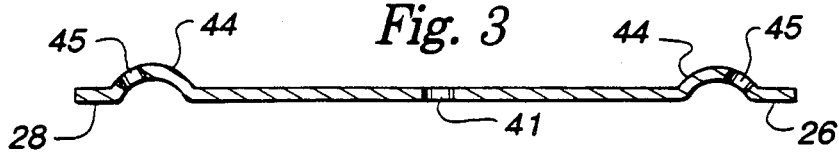
FIG. 3 is a cross-sectional view as viewed along the section line 3—3 of FIG. 2.

Each of the side connection brackets 26 and 28 is further provided with a plurality of nail positioning elements 44 positioned near the outer edge 34 to facilitate angled nailing into the beam 11 as illustrated in FIGS. 4 and 5. In the preferred embodiment, each of the elements 44, like the dimpled nail openings 22, comprises a raised dimple or bubble surface portion which is raised above the front flat surface of the side brackets 26 and 28. The specific raised dimple or bubble construction of the members 44 is illustrated best in FIG. 3 and is shown as comprising a domeshaped spherical portion which intersects with the bracket surface in a generally circular configuration. Each of the dimple surface portions 44 is provided with a nail opening 45. Each of the nail openings 45 is offset from the symmetrical center of the dimple surface portions 44 so as to facilitate angled nailing. In the preferred embodiment, each of the dimple surface portions 44 has an inside radius of approximately 5/16 of an inch and the nail holes 45 are positioned entirely to the outside half of the dimple 44. In the preferred embodiment, five dimple surface portions 44 and corresponding nail openings 45 are provided on each of the brackets 26 and 28.

A pair of connection flanges 31 and 32 extend outwardly from the connection portion 19 for connection to the sides of the rafter 10. In the preferred embodiment, each of the connection flanges 31 and 32 includes an inner edge which is integrally connected with an inside edge of its corresponding side connection bracket 26 and 28. As illustrated in the drawings, the connection flanges 31 and 32 are bent outwardly relative to their respective side connection brackets 26 and 28 along a bend line 46 and 48. It should be noted that the connection flanges 31 and 32 are adjacent to the central opening 39, are offset from one another and are spaced inwardly from the top and bottom edges 36 and 38 of the connection portion 19. Each of the flanges 31 and 32 is provided with a plurality of nail receiving openings 49.

Figure 2:
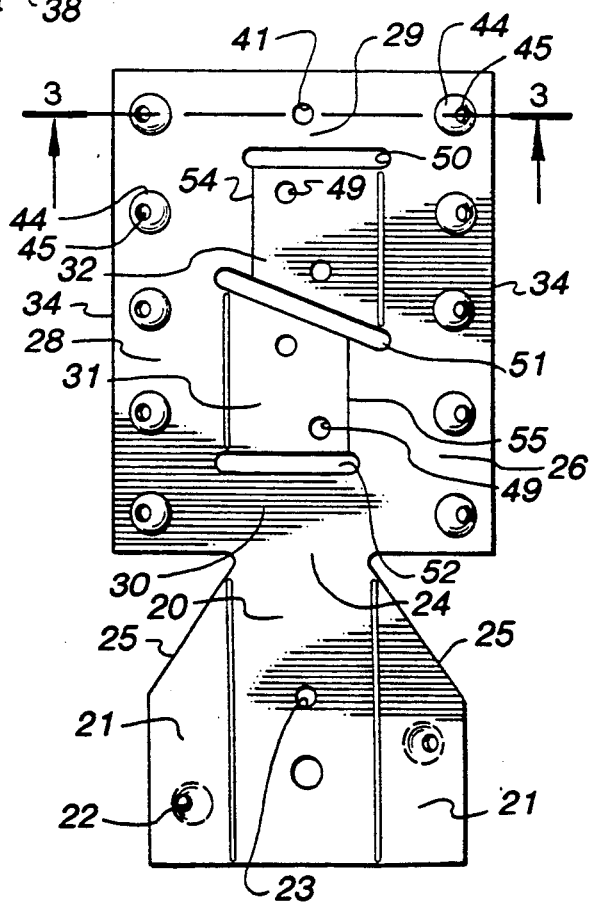
FIG. 2 is a plan view of the slope and skew hanger of the present invention showing its formation from a single piece of material and prior to its respective parts being bent into position for use.

The slope and skew hanger of the present invention is manufactured from a single piece of sheet metal. The hanger, and its flattened form, prior to bending, is illustrated in FIG. 2. During the manufacturing process, cuts are made in the sheet metal to conform to the exterior configuration of the hanger as well as to cut out the sections 50, 51 and 52 and to make the cut lines 54 and 55 to define the flanges 31 and 32. Following these cuts, the nail receiving holes 22, 23, 41, 45, and 49 are drilled or punched. This is in turn followed by forming the raised dimple surface portions 44 by an appropriate punch or other forming process. The various portions of the hanger can then be bent to conform to the shape in which the hanger is desired to be shipped, displayed or sold. Such bends, include bending of the seat sides 21 upwardly relative to the seat 20, bending of the seat 20 forwardly relative to the connection portion 19, and bending of the connection flanges 31 and 32 outwardly relative to the side connection brackets 26 and 28.

When the device is used, the hanger is first connected to the rafter 10 by nailing the seat 20 to the bottom edge of the rafter 10 by driving a nail through the nail receiving opening 23. The seat sides 21 are also connected to the rafter by nails driven through the nail receiving openings 22. The connection portion 19 of the hanger is secured to the end of the rafter or supported member 10 by driving a nail through the nail receiving opening 41 and into the end of the rafter 10. If the rafter is intended to be mounted to a supporting member or beam 11 in a position that is only sloped, but not skewed, relative to the beam 11, nails are driven through the nail receiving openings 45 as illustrated in FIG. 4. The presence of the raised dimple or bubble surface portion 44 and the offset positioning of the nail opening 45 facilitates angle nailing.

If the orientation between the rafter 10 and beam 11 is such that the rafter 10 is skewed relative to the beam 11, whether or not is also sloped, the side connection brackets 26 and 28 are bent relative to the connection strips 29 and 30 along bend lines corresponding to the inner edges of the brackets 26 and 28. After such bending, the brackets 26 and 28 are in the positions illustrated in FIG. 5. Nails are then driven through the nail receiving openings 45 and into the front face of the beam 11.

An alternate embodiment 60 of the present invention is illustrated in FIGS. 6 and 7. This alternate embodiment is designed to facilitate a relatively wide supported member or rafter. Such embodiment includes a seat portion having a seat member 70, a pair of seat sides 71, 71, a nail hole 74 in the member 70 and a pair of nail holes 72 in the sides 71.

The connection portion of the alternate embodiment includes a pair of side connection brackets 61 and 62, top and bottom connecting strips 64 and 64, and a pair of connection flanges 65 and 66. An opening 68 is provided in the connection portion. The flanges 65 and 66, unlike the flanges 31 and 32 of the preferred embodiment, are generally rectangular and extend the entire length of the longitudinal edges of the opening 68. The brackets 61 and 62 are provided with dimpled nail openings 69, while the flanges are provided with normal nail openings 67.

Although the description of the preferred embodiment has been quite specific, it is contemplated that various changes could be made to the structure of the present invention without deviating from the spirit thereof. Accordingly, it is intended that the scope of the present invention be dictated by the appended claims rather than by the description of the preferred embodiment.

I claim:

1. A structure comprising: a supported wooden member, a supporting wooden member, and a bracket joining said supported wooden member and said supporting wooden member together, said bracket including a plurality of integrally formed flanges each connected by nailing to at least one of said supported and supporting wooden members, at least one of said flanges including a mounting planar surface for engagement with at least one of said supported and supporting wooden members and a nail receiving planar surface spaced from and extending parallel to said mounting planar surface on said at least one flange for receiving nails to connect said at least one flange to at least one of said supported and supporting wooden members, means for facilitating angled nailing of said at least one flange to at least one of said supporting and supported members including a raised surface portion integrally formed with and extending above and outwardly from said nail receiving planar surface of said at least one flange, said raised surface portion extending away from said mounting planar surface of said at least one flange of said bracket such that a convex, dome shaped surface configuration is formed on and relative to said nail receiving planar surface; and a nail receiving opening formed in said raised surface portion.

2. The bracket of claim 1 wherein said raised surface portion comprises a generally spherical surface configuration.

3. The bracket of claim 2 including an intersection between said raised surface portion and said nail receiving planar surface wherein said intersection forms a circular configuration.

4. The bracket of claim 1 wherein said raised surface portion includes a symmetrical center and said nail receiving opening is offset to one side of said symmetrical center.

5. A bracket for connecting a pair of wooden, nail receiving members and facilitating angled nailing of said bracket to at least one of said nail receiving members, said bracket comprising:
a plurality of integrally formed flanges each adapted for connection to at least one of said nail receiving members, at least one of said flanges including:
a first planar surface for engagement with at least one of said nail receiving members,
a second, nail receiving planar surface spaced from and extending parallel to said first planar surface on said at least one flange surface;
at least one raised surface portion integrally formed with and extending above and outwardly from said second planar surface of said at least one flange, said at least one raised surface portion extending away from said first planar surface of said at least one flange such that a convex, dome shaped surface configuration is formed on and relative to said second planar surface; and
at least one nail receiving opening formed in said raised surface portion.

6. The bracket of claim 5 wherein said raised surface portion includes a center and wherein a portion of said receiving opening is offset from said center.

7. The bracket of claim 5 wherein said raised surface portion includes a center and wherein the entirety of said nail receiving opening is offset to one side of said center.

8. The bracket of claim 5 wherein said raised surface portion comprises a generally spherical surface configuration.

9. The bracket of claim 8 wherein the intersection of said raised surface portion with said second planar surface forms a generally circular configuration.

10. The bracket of claim 5 including a single nail receiving opening in said raised surface portion.

11. The bracket of claim 5 wherein said raised surface portion forms a convex dimple.

12. The bracket of claim 5 wherein each of a plurality of said flanges includes:
said first planar surface;
said second nail receiving planar surface;
said at least one raised surface portion; and
said at least one nail receiving opening.

13. The bracket of claim 5 wherein said at least one flange includes:
a plurality of said raised surface portions integrally formed with and extending above and outwardly from said second planar surface such that a convex configuration is formed relative to said second planar surface, and
a nail receiving opening in each of said raised surface portions.

14. The bracket of claim 5 wherein said raised surface portion includes an interior which is substantially free of any structure.

* * * * *